(12) United States Patent
Chowdhury et al.

(10) Patent No.: US 10,455,469 B2
(45) Date of Patent: Oct. 22, 2019

(54) RADAR CHANNEL SWITCHING FOR WI-FI VIRTUAL REALITY

(71) Applicant: Intel Corporation, Santa Clara, CA (US)

(72) Inventors: Rajneesh Chowdhury, Portland, OR (US); Noam Ginsburg, Portland, OR (US); Ofer Hareuveni, Haifa (IL); Karthik Veeramani, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 15/857,046

(22) Filed: Dec. 28, 2017

(65) Prior Publication Data

US 2019/0037462 A1      Jan. 31, 2019

(51) Int. Cl.
*H04W 36/14*      (2009.01)
*H04W 36/00*      (2009.01)
*H04L 29/06*      (2006.01)

(52) U.S. Cl.
CPC ......... *H04W 36/14* (2013.01); *H04L 65/4076* (2013.01); *H04L 65/604* (2013.01); *H04L 67/38* (2013.01); *H04W 36/0005* (2013.01); *H04L 65/4069* (2013.01)

(58) Field of Classification Search
CPC ........................ H04L 65/4069; H04L 65/604
See application file for complete search history.

(56) References Cited

U.S. PATENT DOCUMENTS

2005/0231419 A1* 10/2005 Mitchell .............. G08G 5/0026
                                                                 342/36

\* cited by examiner

*Primary Examiner* — Keith Ferguson
(74) *Attorney, Agent, or Firm* — Schwegman Lundberg & Woessner, P.A.

(57) ABSTRACT

Systems and methods may use radar channels for virtual reality streaming or output. A method may include sending virtual reality content to a head-mounted device over a radar channel, detecting a signal on the radar channel, propagating channel switch feedback to a virtual reality subsystem using an interface between the virtual reality subsystem and a wireless component. The method may include modifying the virtual reality content based on the channel switch feedback, such as by using the virtual reality subsystem.

25 Claims, 8 Drawing Sheets

| CHANNEL NUMBER | CHANNEL FREQUENCY MHZ | UNITED STATES (FCC) |
|---|---|---|
| 36 | 5180 | ✓ |
| 40 | 5200 | ✓ |
| 44 | 5220 | ✓ |
| 48 | 5240 | ✓ |
| 52 | 5260 | DFS |
| 56 | 5280 | DFS |
| 60 | 5300 | DFS |
| 64 | 5320 | DFS |
| 100 | 5500 | DFS |
| 104 | 5520 | DFS |
| 108 | 5540 | DFS |
| 112 | 5560 | DFS |
| 116 | 5580 | DFS |
| 120 | 5600 | DFS |
| 124 | 5620 | DFS |
| 128 | 5640 | DFS |
| 132 | 5660 | DFS |
| 136 | 5680 | DFS |
| 140 | 5700 | DFS |
| 149 | 5745 | ✓ |
| 153 | 5765 | ✓ |
| 157 | 5785 | ✓ |
| 161 | 5805 | ✓ |
| 165 | 5825 | ✓ |

*FIG. 5*

RADAR CHANNEL SWITCHING FOR WI-FI VIRTUAL REALITY

BACKGROUND

Low-latency video applications such as virtual reality (VR) are difficult to stream over wireless data networks (e.g., Institute of Electrical and Electronics Engineers (IEEE) 802.11 family of standards often known as Wi-Fi® (hereinafter, Wi-Fi), because of the congestion of 5 and 2.4 GHz bands. Radar channels (DFS) within the 5 GHz band are less congested, enabling a Wi-Fi access point (AP) or a host computer running a VR app to switch the connected Wi-Fi client (e.g., a head-mounted device (HMD)) to a radar channel and achieve better performance. Due to regulatory requirements on usage of DFS channels and non-preemption requirements for high priority devices such as military or police devices, difficulties in using the radar channels often arise.

Current use of radar channels is incompatible with virtual reality. When radar use is detected in the same channel as a device, the device is allowed a maximum of 200 ms to vacate the channel and move to another one. The typical time to switch channels is 100 ms, which may go up to 1.5 seconds on some implementations. For VR applications, a user would experience stalling of the VR experience during the switching time, leading to unacceptable user experience and essentially renders wireless VR unusable in these bands.

Other requirements of using radar channels require use of a radar detector to continuously scan radar channels intended to be used. A DFS channel may be determined to be usable only after scanning for a minimum of one minute (and detecting no other devices on the channel). When a device is forced to vacate a DES channel (e.g., due to detected use by another device on the radar channel), the device must move to a congested (non-DES) channel for at least one minute. While on the congested channel, the user may experience intermittent freezes in the VR experience, which makes wireless VR unusable.

Errors such as latency, missing frames, or poor user experience may have a disproportionate effect on VR due to the nature of the VR experience, even when the issues are momentary. Users may experience nausea, disorientation, or lose emersion in the virtual reality, with any of the errors above. These results may cause users to become dissatisfied with VR, temporarily stop using VR, or not use VR altogether.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 5 illustrates a 5 GHz spectrum in accordance with some embodiments.

DETAILED DESCRIPTION

Systems and methods for using radar channels for virtual reality (VR) output are described herein. Providing VR over Wi-Fi has a number of challenges due to congestion of unregulated channels on the 5 GHz and 2.4 GHz bands. The 5 GHz band includes a number of channels that are used for radar (called radar channels herein, some radar channels are also called dynamic frequency selection (DFS) channels). The radar channels may be used by devices for Wi-Fi implementations, however, most governments provide restrictions on the use. When providing VR from a host device over Wi-Fi to a head-mounted device (HMD) or other display receiver for VR output, the host device may send the VR over radar channels subject to these restrictions.

For example, in the United States, when radar use is detected in the radar channel used to broadcast the VR, the host device is allowed a maximum of 200 ms to vacate the radar channel, such as by stopping broadcasting entirely or by moving to another channel. In order to use a radar channel, a radar detector must scan the radar channel for a minimum of sixty seconds, detecting no signals or uses of that radar channel, before the host device may use that radar channel.

The systems and methods described herein provide adjustments to the VR pipeline to compensate for challenges during a channel transition period and proactively use a radar detector ahead of any collisions or detected signals. VR is among the most latency-sensitive applications, far more than common real-time video apps such as video chat or screen sharing. Issues with user experience may cause extreme intolerance to some users (e.g., nausea, dizziness, loss of immersion, or the like), which may in turn cause technology adoption of VR to slow down drastically.

The systems and methods described herein improve the user experience of Wi-Fi VR during channel switches and temporary congestions by arranging improvements ahead of conflicts. For example, a radar detector may be connected in a Wi-Fi chipset closely with a VR subsystem, allowing the VR subsystem to alter the flow of a VR pipeline based on information from the radar detector. The pipeline may be altered in a number of different ways or combinations, as described below. In an example, a special high-priority queue to the Wi-Fi subsystem may be used to help dispatching VR data in alignment with channel switches.

Figure 1:
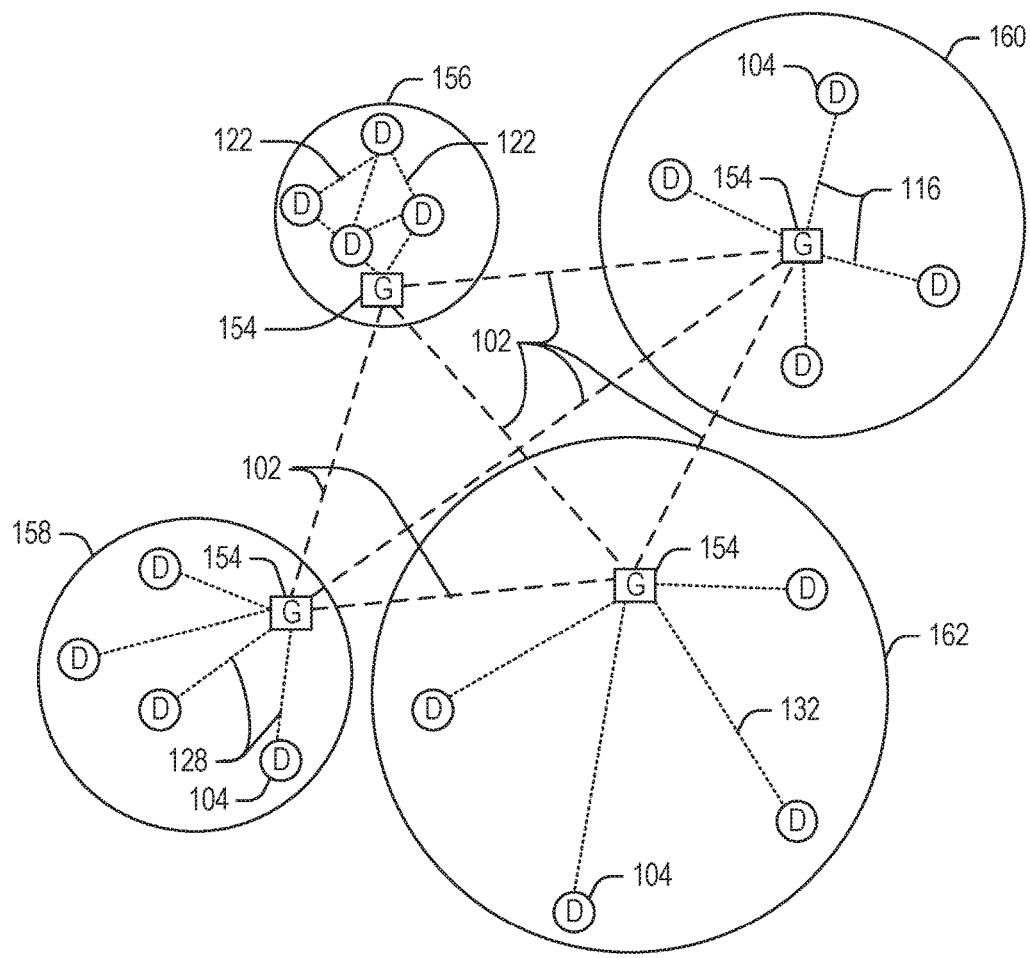
FIG. 1 illustrates a domain topology for respective internet-of-things (IoT) networks coupled through links to respective gateways in accordance with some embodiments.

FIG. 1 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
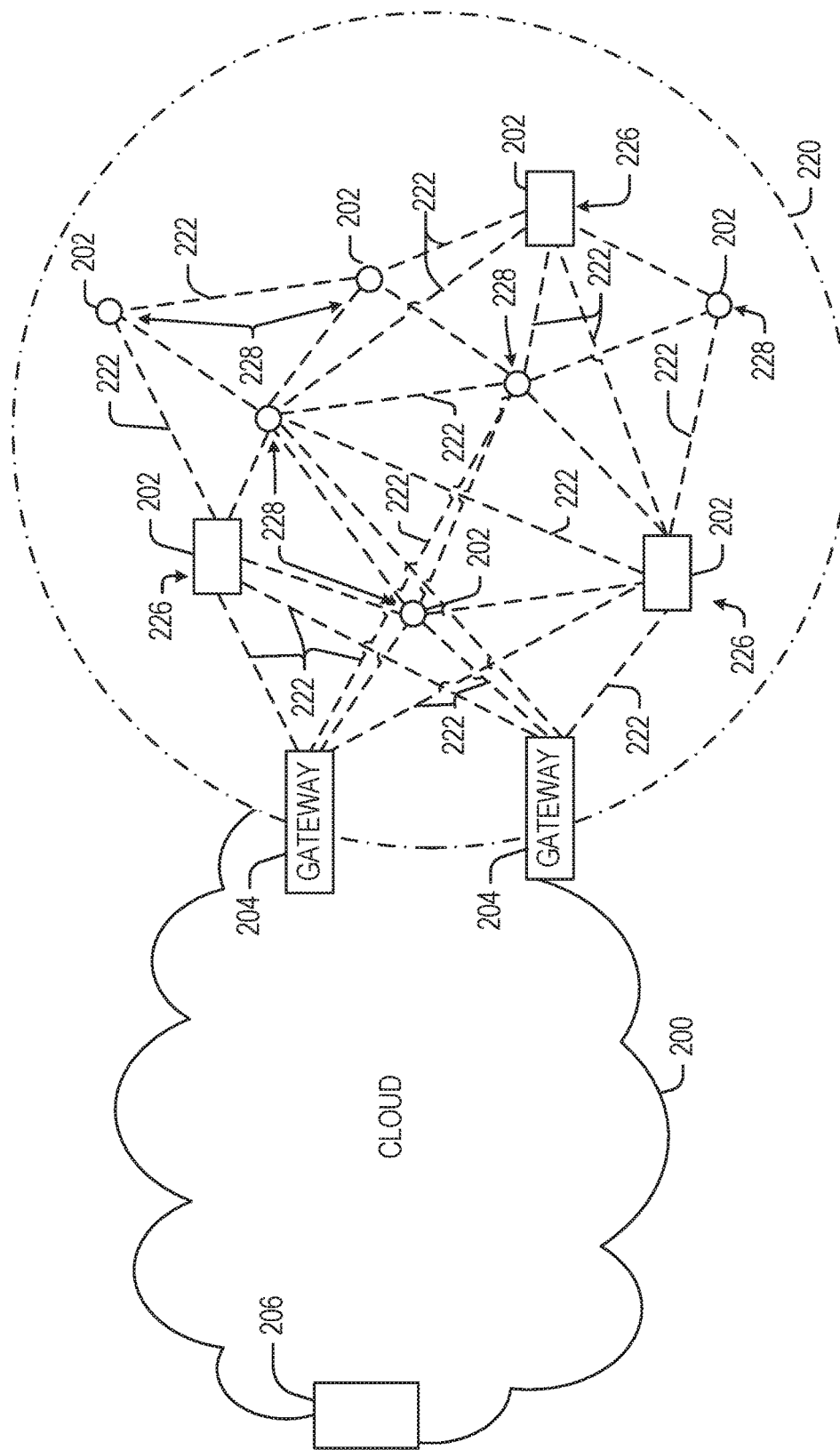
FIG. 2 illustrates a cloud computing network in communication with a mesh network of IoT devices operating as a fog device at the edge of the cloud computing network in accordance with some embodiments.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of internet-of-things (IoT) networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and traceability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 7 and 8.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 2 below.

FIG. 2 illustrates a cloud computing network in communication with a mesh network of IoT devices (devices 202) operating as a fog device at the edge of the cloud computing network. The mesh network of IoT devices may be termed a fog 220, operating at the edge of the cloud 200. To simplify the diagram, not every IoT device 202 is labeled.

The fog 220 may be considered to be a massively interconnected network wherein a number of IoT devices 202 are in communications with each other, for example, by radio links 222. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog 220 provided from these IoT devices 202 may be presented to devices in the cloud 200, such as a server 206, as a single device located at the edge of the cloud 200, e.g., a fog device. In this example, the alerts coming from the fog device may be sent without being identified as coming from a specific IoT device 202 within the fog 220. In this fashion, the fog 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog device may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog 220 device selecting the IoT devices 202, such as particular sensors 228, needed to answer the query. The data from these sensors 228 may then be aggregated and analyzed by any combination of the sensors 228, data aggregators 226, or gateways 204, before being sent on by the fog 220 device to the server 206 to answer the query. In this example, IoT devices 202 in the fog 220 may select the sensors 228 used based on the query, such as adding data from flow sensors or temperature sensors. Further, if some of the IoT devices 202 are not operational, other IoT devices 202 in the fog 220 device may provide analogous data, if available.

Figure 3:
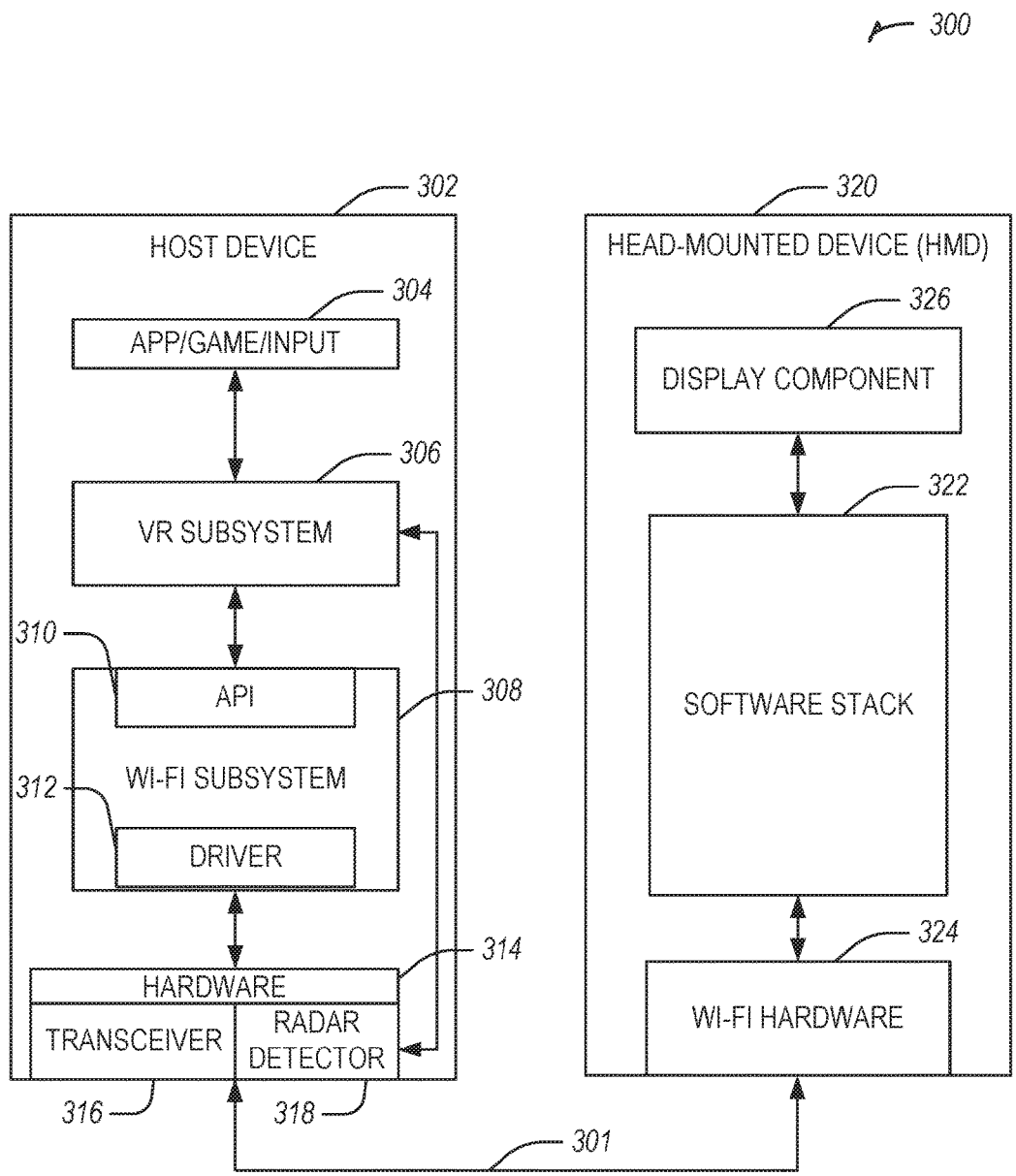
FIG. 3 illustrates a host device and a display device for use within a low latency VR system in accordance with some embodiments.

FIG. 3 illustrates a host device 302 and a display device 320 for use within a low latency VR system 300 in accordance with some embodiments. The host device 302 may include a VR content creation component 304, such as an app, a game, a VR input, etc. The VR content creation component 304 may send the VR content to a VR subsystem 306, which may apply changes to the VR content, for example in response to switching or impending switching off of a radar channel. The VR subsystem 306 may communicate with a Wi-Fi subsystem 308, for example over an API 310. The VR subsystem 306 may communicate with a radar detector 318, for example to receive an indication of interference or a signal on a radar channel 301. The Wi-Fi subsystem 308 may include one or more drivers 312 to communicate with hardware, for example including Wi-Fi MAC and PHY layers 314 of the host device 302, such as the radar detector 318 or a Wi-Fi antenna or transceiver 316. In an example, the hardware may include a plurality of radar detectors, for example, two to monitor a current radar channel 301 and a second radar channel. A second radar detector may monitor the second radar channel (e.g., for more than a minute), such that if a signal is detected on the current radar channel 301, the Wi-Fi subsystem 308 may initiate a switch from the current radar channel 301 to the second radar channel without needing to wait. The Wi-Fi MAC and PHY layers 314 include hardware or embedded firmware that may monitor channel conditions.

The host device 302 may communicate (e.g., via the transceiver 316) with a head-mounted device (HMD) 320 or other VR display device. The HMD 320 may include a software stack 322 for presenting the VR content and a Wi-Fi hardware component 324 to receive the VR content or process the VR content for presentation at the HMD 320. The HMD 320 may include a display component 326 (e.g., lenses, a screen, etc.) for displaying the VR content.

In the low latency VR system 300, the host device 302 may include a logical connection between the VR subsystem 306 and the radar detector 318. The radar detector 318 (or the Wi-Fi driver 312) may provide a callback to the VR subsystem 306, for example, when a channel transition is about to occur or when completed, or when a congested channel has been chosen as a temporary channel stopover (e.g., while waiting the one minute for the radar detector 318 to observe a new radar channel). The congested channel may be identified by the radar detector 318 or the Wi-Fi MAC and PHY layers 314. In response to receiving a channel transition indication (about to occur or already occurred), the VR subsystem 306 may perform one or more quality of service (QoS) adjustments (as described in more detail below), such as to improve user experience during the transition.

The VR subsystem 306 may be used to control a VR pipeline (e.g., VR content as it is created at the VR content creation component 304 and is sent via the transceiver 316 to the HMD 320). The VR subsystem 306 may act as an interface between the VR content creation component 304 and the connected hardware such as the HMD 320 or a controller. In an example, the VR content creation component 304 may be responsible for generating VR frames, for example based on user input or view. The VR subsystem 306 may control how or when the VR frames are dispatched to the HMD 320, whether a new frame is needed for a particular user head positions, etc. The VR subsystem 306 has a connection to the radar detector 318, which allows the VR subsystem 306 to take action to correct for issues during channel transitions.

The Wi-Fi subsystem 308 (which may include a wireless network software stack) may act as an interface for Wi-Fi operations, including radar detection. The Wi-Fi subsystem 308 may provide a software interface (e.g., the API 310 or the driver 312) to the VR subsystem 306 to communicate with the connected HMD 320. For example, the Wi-Fi subsystem 308 may provide a callback to the VR subsystem 306 when a channel switch is about to happen, with an estimated time to begin the switch and estimated time of transition. In this example, the Wi-Fi subsystem 308 may receive an indication from the radar detector 318 that a signal has been detected on the radar channel 301 that is being used to send the VR content to the HMD 320 by the transceiver 316. The Wi-Fi subsystem 308 may use a wireless network software stack to receive an indication from the Wi-Fi MAC and PHY 314, the indication identifying that the radar channel 301 in use is congested. Based on the indication, the Wi-Fi subsystem 308 may initiate a channel switch and notify the VR subsystem 306 of the switch. The Wi-Fi subsystem 308 may change QoS aspects of a frame or frames, add frames to a special Wi-Fi queue, or otherwise modify the VR pipeline as described further below. These changes may occur before the switch to the second channel occurs.

In an example, the Wi-Fi subsystem 308 may provide a callback to the VR subsystem 308 when a non-DFS channel has been selected as the new channel. When this occurs, the VR subsystem 308 may perform the same or different changes to the VR pipeline as during the switch or for a switch to another radar channel. This callback may include an estimated congestion level of the new channel based on information from the transceiver 316, the radar detector 318, or other hardware (e.g., a second Wi-Fi antenna, information from a nearby device using another wireless protocol, or the like). The Wi-Fi subsystem 308 may accept changes to the VR pipeline from the VR subsystem 306 during the switch or after the switch. For example, the Wi-Fi subsystem 308 may accept a policy to output VR data in a non-standard way when channel switching is about to begin.

The HMD 320 may be wirelessly coupled with the VR subsystem 306. The HMD 320 may display frames received from the VR subsystem 306 (e.g., via the transceiver 316). The HMD 320 may send a head positions of a user wearing the HMD 320 back to the VR subsystem 306 (e.g., to send to the VR content creation component 304), such as inertial measurement unit (MU) data. The HMD 320 may optionally have non-standard features such as the ability to synthesize intermediate frames. The intermediate frames may be enabled by the VR subsystem 306, for example during a channel switch.

Figure 4:
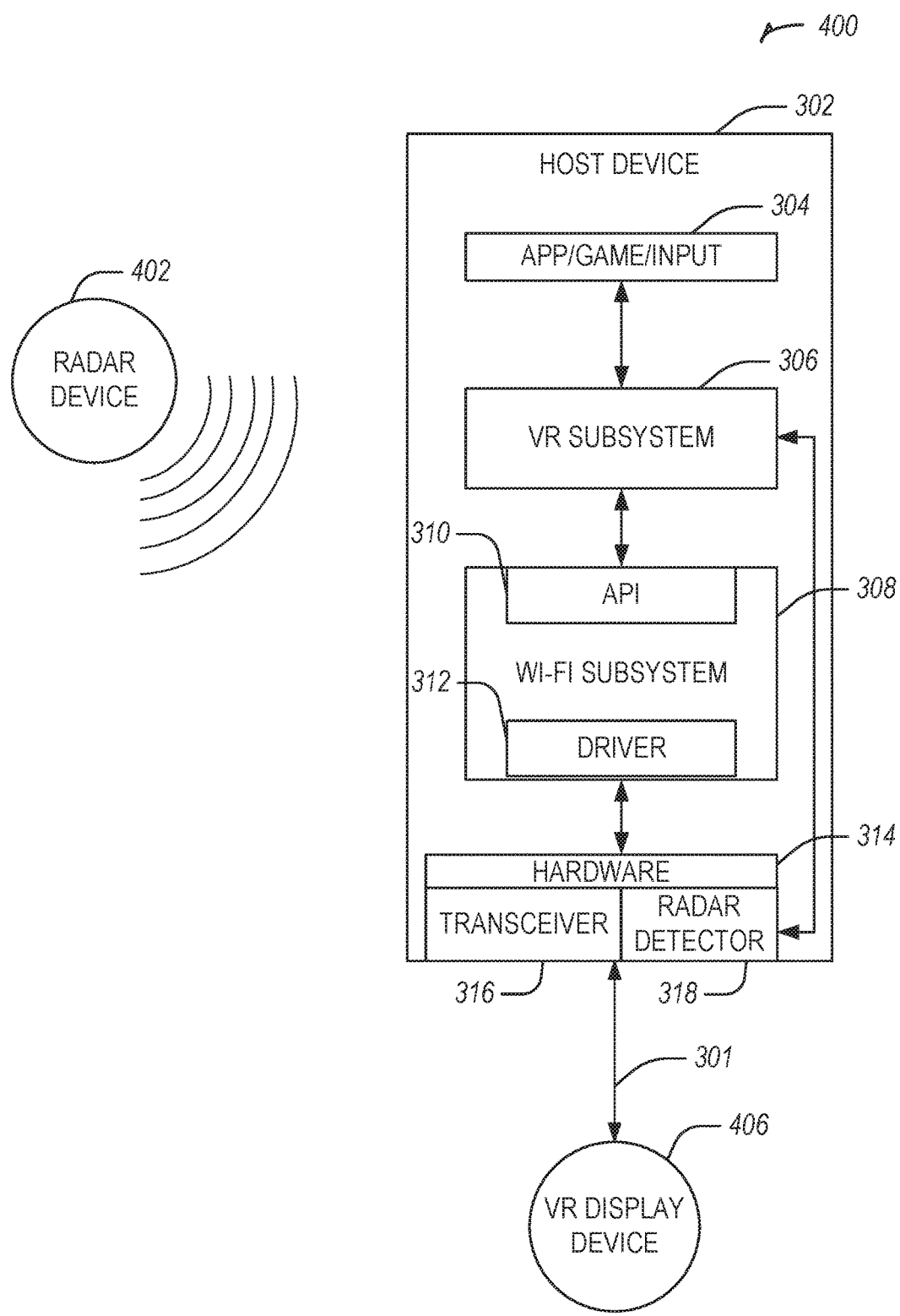
FIG. 4 illustrates a radar device introduced into a low latency system in accordance with some embodiments.

FIG. 4 illustrates a radar device 402 introduced into a low latency system 400 in accordance with some embodiments. The low latency system 400 includes the host device 302 and a VR display device 406. In an example, the VR display device 406 may be the HMD 320 of FIG. 3. The radar device 402 may include a military, police, governmental, or other priority device using a radar channel 301 currently used for communication between the source 404 and the VR display device 406.

When the Wi-Fi subsystem 308 determines that a channel switch is going to occur, such as for signal strength reasons or when the radar detector 318 detects a signal from the radar device 402 on the channel, the Wi-Fi subsystem 308 may provide a callback to the VR subsystem 306, including an estimated time (Es) of the switch or an approximate duration of the switch (Ds). In an example, in response to receiving the callback, the VR subsystem 306 may perform one or more of the mitigations described below. Additional mitigations may be performed by the VR subsystem 306 other than those described below.

In an example, the VR subsystem 306 may render frames of VR content at a lower rate. In another example, the VR subsystem 306 may refrain from rendering one or more frames during the period Ds (e.g., not send a frame). For example, any rendered frame during this time Ds may not reach the VR display device 406, and may become a backlog in the Wi-Fi queue, which may need to be dispatched after switching to a new channel. The backlog may cause additional latency and may not meaningfully improve user experience (old frames may not be aligned to a user's current view). Using the VR subsystem 306 to render the VR content at a lower frame rate or excluding frames altogether may prevent this backlog. In another example, the VR subsystem 306 may send a request to the VR content creation component 304 to render a predicted frame for Ds milliseconds in the future, such that when the channel switch is completed, the frame dispatched may match a user's then-current view. The lower frame rate frames or the predicted frame may be sent before the channel switch has occurred (such as during the 200 ms allocated for switching off of a radar channel 301 when a signal from the radar device 402 is detected by the radar detector 318).

In an example, the VR subsystem 306 may enable frame synthesis for the duration Ds on the VR display device 406, such as the HMD 320 of FIG. 3 when the HMD 320 has this capability. The VR display device 406 may keep the user engaged with synthesized frames for the duration Ds, during which the host device 302 may not be able to send actual frames (e.g., during switching, while occupying a congested channel, etc.). In order to enable the frame synthesis, the VR subsystem 306 may put a messages in a special Wi-Fi queue that the Wi-Fi subsystem 308 dispatches via the transceiver 316 before channel transition (e.g., during the 200 ms allocated for switching). The VR display device 406 may receive the frame synthesis enabling command before the Es time (which may be communicated from the host device 302 to the VR display device 406, as the VR display device 406 to facilitate channel switching at the VR display device 406).

In an example, the VR subsystem 306 may detect that a current portion of VR content to be sent includes a last portion of a frame. In response, the VR subsystem 306 may put the last portion of the frame data into a special Wi-Fi queue, which may be dispatched before channel switching. In another example, when the VR subsystem 306 detects that a current portion of VR content includes a new frame, the VR subsystem 306 may discard the new frame data instead of sending it. For example, when the VR display device 406 has received most of a frame, sending the last portion allows the VR display device 406 to receive a complete updated frame that may later be used to synthesize new frames during channel transition. In the other example, when a new frame is about to be sent and sending the frame is determined to take longer than the estimated start of channel switch (e.g., between a current time and Es), discarding the frame prevents a partial frame from being sent which may not be usable.

In an example, the VR subsystem 306 may modify the VR pipeline when temporary congestion occurs or is upcoming. For example, when the Wi-Fi subsystem 308 is switching to a congested channel temporarily, the Wi-Fi subsystem 308 may provide a callback to the VR subsystem 306 with an estimated time to enter the channel (Ec), a duration expected in that channel (Dc), or a measure of the congestion level (Cc). In response to receiving the callback, the VR subsystem 306 may perform one or more of the following mitigations, described below. Additional mitigations may be performed by the VR subsystem 306 other than those described below.

In an example, the VR subsystem 306 may adjust a GPU (e.g., of the host device 302) to render frames at a lower resolution or a lower pixel density, such as a resolution or pixel density that may be supported at the new congestion level of the channel. The VR subsystem 306 may communicate the changes to the VR display device 406 ahead of the channel switch, such as during the 200 ms given to switch (e.g., before Ec). The VR display device 406 may be used to enable an upscaling algorithm to handle with the lowered resolution or pixel density.

In another example, for non-interactive content such as video playback, a main GPU of the host device 302 or an auxiliary processing unit (such as integrated graphics, when the main GPU is discrete graphics) may be used to decode or render additional frames for the duration Dc. The frames may be dispatched using the special priority queue mentioned above before switching. The additional frames may be predicted either through motion prediction of user's head movements (as identified by the VR display device 406) over a period of time or by utilizing points of interest in the VR content. For example, when a movie director has embedded cues in a 360 degree movie as the most interesting portions at various times, these points of view may be assumed to be where the user is likely to look. Dispatching these ahead of time from the VR subsystem 306 via the transceiver 316, along with metadata about the head position associated with each frame, allows the VR display device 406 to buffer and use the frames when the channel becomes congested. The user's view may align with some frames buffered for these specific times.

FIG. 5 illustrates a 5 GHz spectrum 500 in accordance with some embodiments. The 5 GHz spectrum 500 illustrates a plurality of congested channels, such as those falling between 36 and 48 or 149 and 165. The 5 GHz spectrum 500 also illustrates a plurality of radar channels (marked DFS in FIG. 5 for dynamic frequency selection), such as those falling between 52 and 140. These designations (radar or congested) for the channels are shown using the United States regulations in FIG. 5, as promulgated by the Federal Communication Commission (FCC). In other countries, different ranges may be used for radar or congested (including not having any congested channels in the 5 GHz range) or different designations may be indicated. The radar channels designated by any governing body may be used, may be changed, or may shift without affecting the scope of this application. Other radar channels may be used outside of the 5 GHz spectrum 500, such as those that are useable by a Wi-Fi antenna of a device (e.g., the transceiver 316 of FIGS. 3-4).

Figure 6:
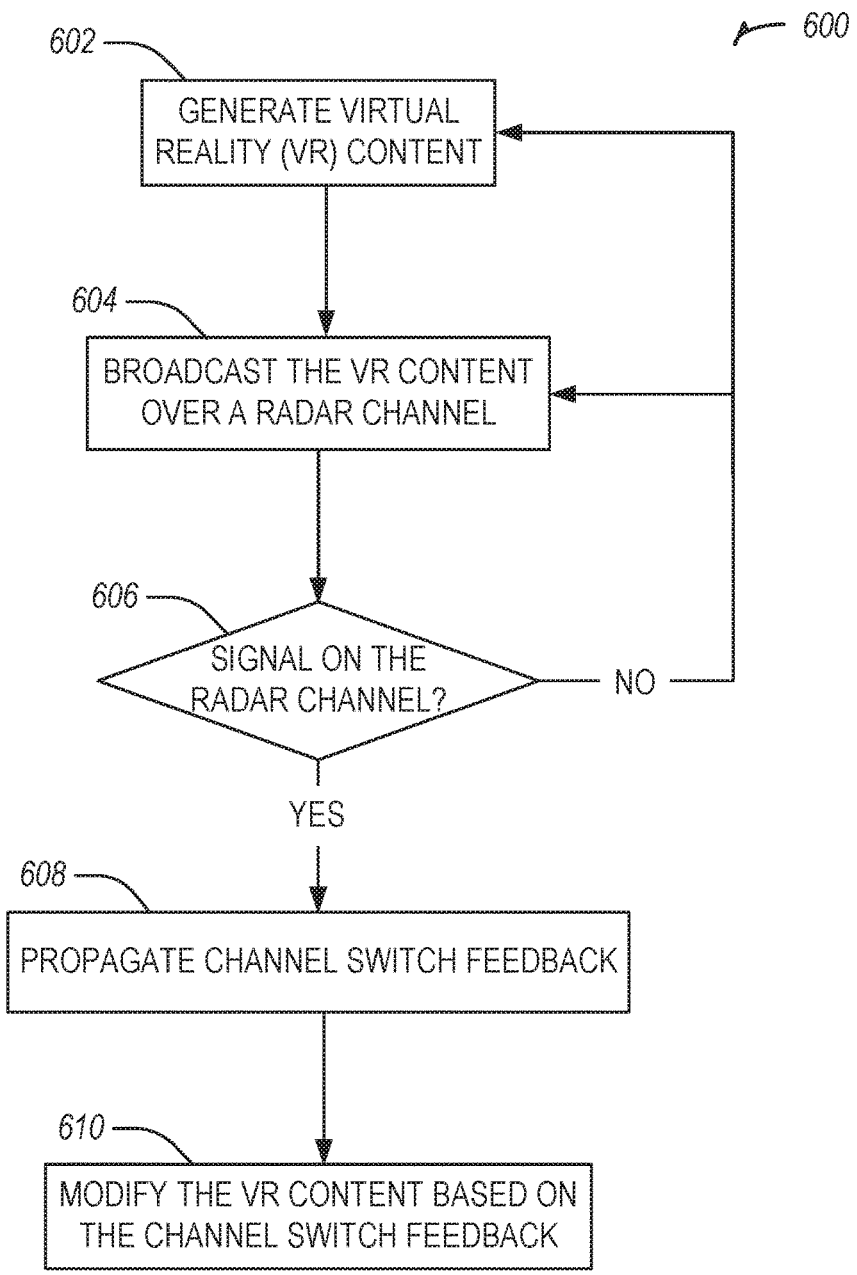
FIG. 6 illustrates a flowchart showing a technique for using radar channels for virtual reality output in accordance with some embodiments.

FIG. 6 illustrates a flowchart showing a technique 600 for using radar channels for virtual reality output in accordance with some embodiments. The technique 600 includes an operation 602 to generate virtual reality (VR) content, for example using a VR subsystem. The technique 600 includes an operation 604 to broadcast the VR content over a radar channel, for example using a Wi-Fi component. The VR content may be broadcast to a head-mounted device.

The technique 600 includes a decision operation 606 to determine whether a signal on the radar channel is detected, for example using a radar detector. When no signal is detected, the technique may include returning to operations 602 or 604, to continue to generate or broadcast VR content. The technique 600 includes an operation 608 to, in response to determining that there is a signal on the radar channel, propagate channel switch feedback, for example from the radar detector to the VR subsystem using an interface. Operation 608 may include notifying the VR subsystem of an upcoming channel switch in advance of switching from the radar channel.

The technique 600 includes an operation 610 to modify the VR content based on the channel switch feedback, for example before switching channels. In another example, the VR content may be modified after switching channels. The VR content may be modified by the VR subsystem. For example, the technique 600 may include an operation to render the VR content at a lower frame rate or not render frames during a duration of a channel switching time. In another example, frame synthesis may be enabled for a duration of a channel switch time by sending a message to the head-mounted device via a special Wi-Fi queue that the Wi-Fi component dispatches before switching from the radar channel. The technique 600 may include identifying that queued content is a last portion of a frame, and in response, sending the last portion of the frame to a special Wi-Fi queue for dispatching from the Wi-Fi component before switching from the radar channel. In another example, the technique 600 may include identifying that queued content is a new frame, and in response, discarding the queued content instead of sending it the Wi-Fi component.

The technique 600 may include switching to a second channel, using the Wi-Fi component, in response to the radar detector detecting the signal on the radar channel. For example, the Wi-Fi component may switch to broadcasting on the second channel after the signal is detected on the radar channel. The second channel may be a second radar channel, a non-radar 5 GHz Wi-Fi channel, or a 2.4 GHz Wi-Fi channel (e.g., a congested channel). When the second channel is a radar channel, the technique 600 may include using a second radar detector to determine that the second radar channel is clear (e.g., for at least sixty seconds) before the Wi-Fi component switches to the second radar channel. In an example, switching to the second channel may include using a priority queue based on information received from the VR subsystem via the interface. In response to the Wi-Fi component switching to a congested channel (e.g., a 5 GHz or 2.4 GHz channel) from the radar channel, the technique 600 may include performing a quality of service change, such as by sending an instruction to adjust a graphics processing unit of the device to render frames at a lower resolution or lower pixel density. In an example, when the VR content is non-interactive content, such as 360 degree video playback or other non-interactive immersive content, the quality of service change may include an instruction to use a graphics processing unit of the device to decode and render additional frames for a duration of time the Wi-Fi component is connected to the congested channel.

In other examples, the operations and functionality described above with reference to FIGS. 3 to 6 may be embodied by an IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 7:
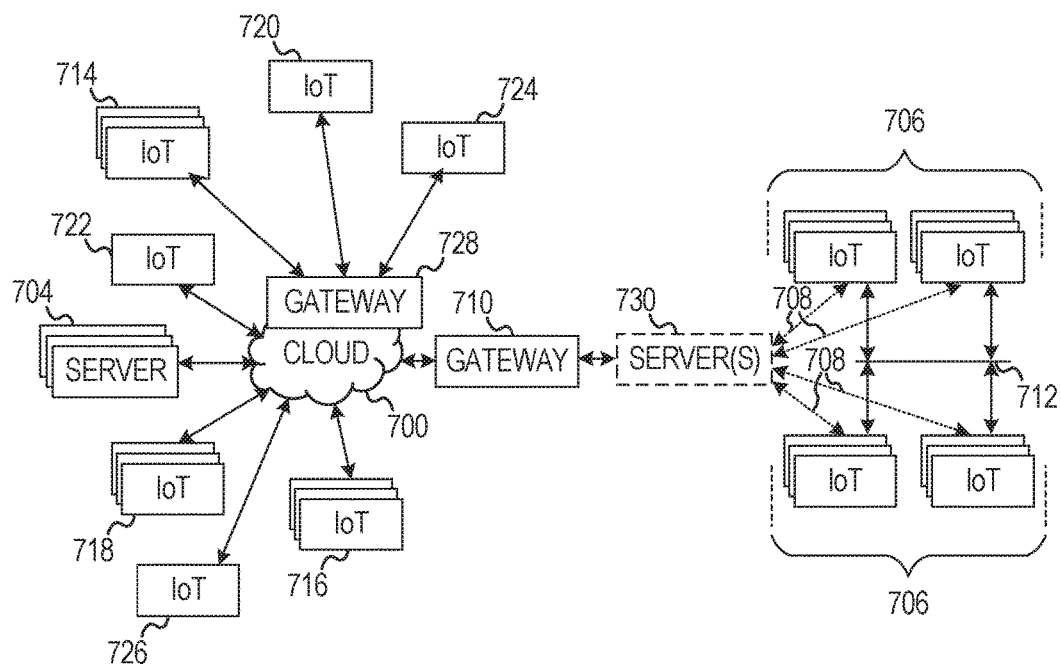
FIG. 7 illustrates a block diagram of a network illustrating communications among a number of IoT devices in accordance with some embodiments.

FIG. 7 illustrates a drawing of a cloud computing network, or cloud 700, in communication with a number of Internet of Things (IoT) devices. The cloud 700 may represent the Internet, or may be a local area network (LAN), or a wide area network (WAN), such as a proprietary network for a company. The IoT devices may include any number of different types of devices, grouped in various combinations. For example, a traffic control group 706 may include IoT devices along streets in a city. These IoT devices may include stoplights, traffic flow monitors, cameras, weather sensors, and the like. The traffic control group 706, or other subgroups, may be in communication with the cloud 700 through wired or wireless links 708, such as LPWA links, optical links, and the like. Further, a wired or wireless sub-network 712 may allow the IoT devices to communicate with each other, such as through a local area network, a wireless local area network, and the like. The IoT devices may use another device, such as a gateway 710 or 728 to communicate with remote locations such as the cloud 700; the IoT devices may also use one or more servers 730 to facilitate communication with the cloud 700 or with the gateway 710. For example, the one or more servers 730 may operate as an intermediate network node to support a local edge cloud or fog implementation among a local area network. Further, the gateway 728 that is depicted may operate in a cloud-to-gateway-to-many edge devices configuration, such as with the various IoT devices 714, 720, 724 being constrained or dynamic to an assignment and use of resources in the cloud 700.

Other example groups of IoT devices may include remote weather stations 714, local information terminals 716, alarm systems 718, automated teller machines 720, alarm panels 722, or moving vehicles, such as emergency vehicles 724 or other vehicles 726, among many others. Each of these IoT devices may be in communication with other IoT devices, with servers 704, with another IoT fog device or system (not shown, but depicted in FIG. 2), or a combination therein. The groups of IoT devices may be deployed in various residential, commercial, and industrial settings (including in both private or public environments).

As may be seen from FIG. 7, a large number of IoT devices may be communicating through the cloud 700. This may allow different IoT devices to request or provide information to other devices autonomously. For example, a group of IoT devices (e.g., the traffic control group 706) may request a current weather forecast from a group of remote weather stations 714, which may provide the forecast without human intervention. Further, an emergency vehicle 724 may be alerted by an automated teller machine 720 that a burglary is in progress. As the emergency vehicle 724 proceeds towards the automated teller machine 720, it may access the traffic control group 706 to request clearance to the location, for example, by lights turning red to block cross traffic at an intersection in sufficient time for the emergency vehicle 724 to have unimpeded access to the intersection.

Clusters of IoT devices, such as the remote weather stations 714 or the traffic control group 706, may be equipped to communicate with other IoT devices as well as with the cloud 700. This may allow the IoT devices to form an ad-hoc network between the devices, allowing them to function as a single device, which may be termed a fog device or system (e.g., as described above with reference to FIG. 2).

Figure 8:
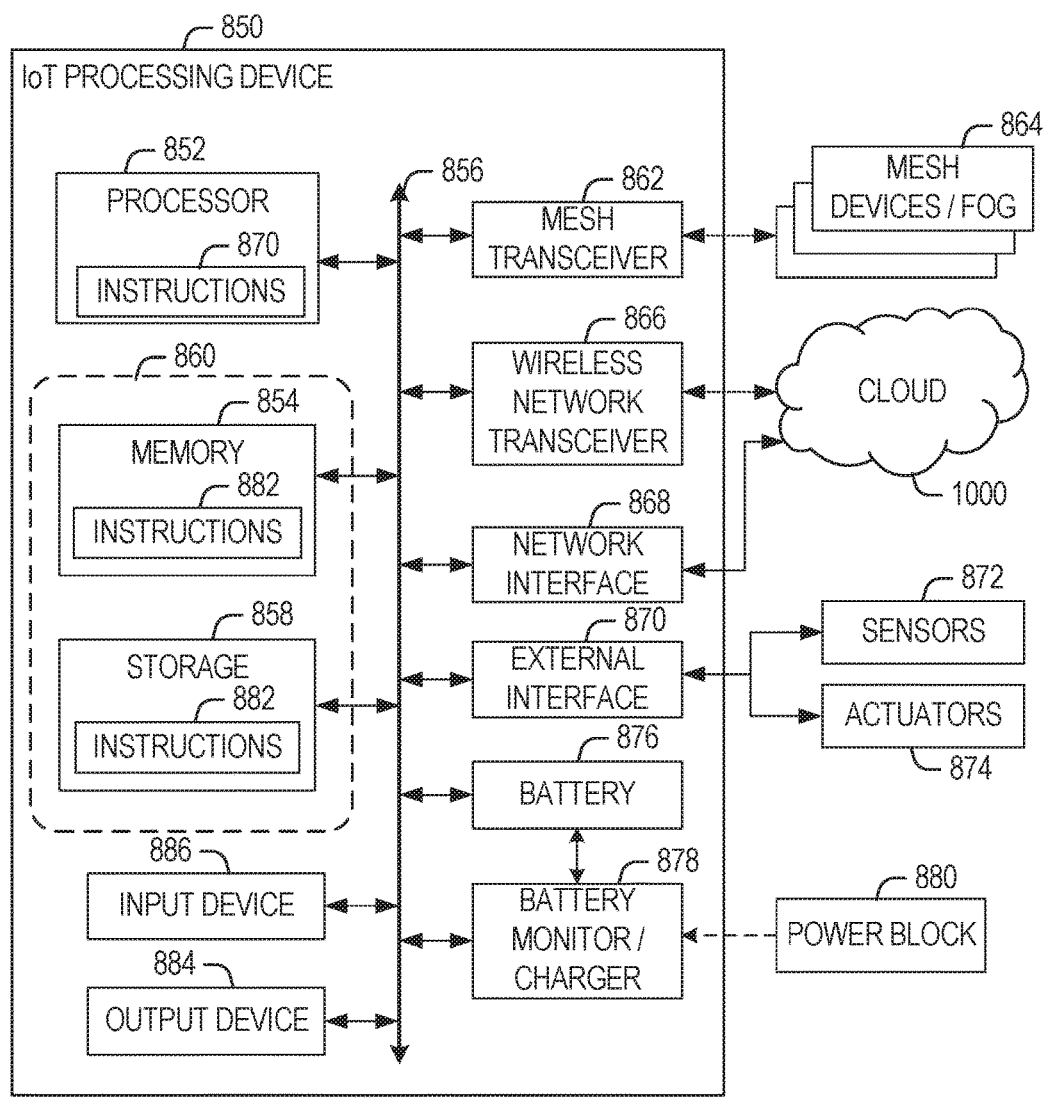
FIG. 8 illustrates a block diagram for an example IoT processing system architecture upon which any one or more of the techniques (e.g., operations, processes, methods, and methodologies) discussed herein may be performed in accordance with some embodiments.

FIG. 8 is a block diagram of an example of components that may be present in an IoT device 850 for implementing the techniques described herein. The IoT device 850 may include any combinations of the components shown in the example or referenced in the disclosure above. The components may be implemented as ICs, portions thereof, discrete electronic devices, or other modules, logic, hardware, software, firmware, or a combination thereof adapted in the IoT device 850, or as components otherwise incorporated within a chassis of a larger system. Additionally, the block diagram of FIG. 8 is intended to depict a high-level view of components of the IoT device 850. However, some of the components shown may be omitted, additional components may be present, and different arrangement of the components shown may occur in other implementations.

The IoT device 850 may include a processor 852, which may be a microprocessor, a multi-core processor, a multi-threaded processor, an ultra-low voltage processor, an embedded processor, or other known processing element. The processor 852 may be a part of a system on a chip (SoC) in which the processor 852 and other components are formed into a single integrated circuit, or a single package, such as the Edison™ or Galileo™ SoC boards from Intel. As an example, the processor 852 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 852 may communicate with a system memory 854 over an interconnect 856 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 858 may also couple to the processor 852 via the interconnect 856. In an example the storage 858 may be implemented via a solid state disk drive (SSDD). Other devices that may be used for the storage 858 include flash memory cards, such as SD cards, microSD cards, xD picture cards, and the like, and USB flash drives. In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in a SoC based system. Other bus systems may be included, such as an I2C interface, an SPI interface, point to point interfaces, and a power bus, among others.

The interconnect 856 may couple the processor 852 to a mesh transceiver 862, for communications with other mesh devices 864. The mesh transceiver 862 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 864. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 862 may communicate using multiple standards or radios for communications at different range. For example, the IoT device 850 may communicate with close devices, e.g., within about 10 meters, using a local transceiver based on BLE, or another low power radio, to save power. More distant mesh devices 864, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 866 may be included to communicate with devices or services in the cloud 800 via local or wide area network protocols. The wireless network transceiver 866 may be a LPWA transceiver that follows the IEEE 802.15.4, or IEEE 802.15.4g standards, among others. The IoT device 850 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, describe IEEE 802.15.4e specification may be used.

Any number of other radio communications and protocols may be used in addition to the systems mentioned for the mesh transceiver 862 and wireless network transceiver 866, as described herein. For example, the radio transceivers 862 and 866 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 862 and 866 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 866, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 868 may be included to provide a wired communication to the cloud 800 or to other devices, such as the mesh devices 864. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 868 may be included to allow connect to a second network, for example, a NIC 868 providing communications to the cloud over Ethernet, and a second NIC 868 providing communications to other devices over another type of network.

The interconnect 856 may couple the processor 852 to an external interface 870 that is used to connect external devices or subsystems. The external devices may include sensors 872, such as accelerometers, level sensors, flow sensors, optical light sensors, camera sensors, temperature sensors, a global positioning system (GPS) sensors, pressure sensors, barometric pressure sensors, and the like. The external interface 870 further may be used to connect the IoT device 850 to actuators 874, such as power switches, valve actuators, an audible sound generator, a visual warning device, and the like.

In some optional examples, various input/output (I/O) devices may be present within, or connected to, the IoT device 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 850.

A battery 876 may power the IoT device 850, although in examples in which the IoT device 850 is mounted in a fixed location, it may have a power supply coupled to an electrical grid. The battery 876 may be a lithium ion battery, or a metal-air battery, such as a zinc-air battery, an aluminum-air battery, a lithium-air battery, and the like.

A battery monitor/charger 878 may be included in the IoT device 850 to track the state of charge (SoCh) of the battery 876. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 878 may communicate the information on the battery 876 to the processor 852 over the interconnect 856. The battery monitor/charger 878 may also include an analog-to-digital (ADC) convertor that allows the processor 852 to directly monitor the voltage of the battery 876 or the current flow from the battery 876. The battery parameters may be used to determine actions that the IoT device 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the IoT device 850. A wireless battery charging circuit, such as an LTC4020 chip from Linear Technologies of Milpitas, Calif., among others, may be included in the battery monitor/charger 878. The specific charging circuits chosen depend on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine readable medium 860 including code to direct the processor 852 to perform electronic operations in the IoT device 850. The processor 852 may access the non-transitory, machine readable medium 860 over the interconnect 856. For instance, the non-transitory, machine readable medium 860 may be embodied by devices described for the storage 858 of FIG. 8 or may include specific storage units such as optical disks, flash drives, or any number of other hardware devices. The non-transitory, machine readable medium 860 may include instructions to direct the processor 852 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

VARIOUS NOTES & EXAMPLES

Each of these non-limiting examples may stand on its own, or may be combined in various permutations or combinations with one or more of the other examples.

Example 1 is a device for sing radar channels for virtual reality output comprising: a virtual reality (VR) subsystem to generate VR content; a wireless component to broadcast the VR content to a head-mounted device over a radar channel; a radar detector to detect a signal on the radar channel; an interface between the VR subsystem and the wireless component to, in response to the radar detector detecting the signal on the radar channel, propagate channel switch feedback to the VR subsystem; and wherein the VR subsystem is to modify the VR content based on the channel switch feedback.

In Example 2, the subject matter of Example 1 includes, wherein the wireless component is to switch to a second channel in response to the radar detector detecting the signal on the radar channel.

In Example 3, the subject matter of Example 2 includes, wherein the second channel is a non-radar 5 GHz channel or a 2.4 GHz channel.

In Example 4, the subject matter of Examples 2-3 includes, wherein the second channel is a second radar channel, and wherein the device further comprises a second radar detector to determine that the second radar channel is clear before the wireless component switches to the second radar channel.

In Example 5, the subject matter of Example 4 includes, wherein to determine that the second radar channel is clear, the second radar detector is to monitor the second radar channel for at least sixty seconds before the wireless component switches to the second radar channel.

In Example 6, the subject matter of Examples 2-5 includes, wherein to switch to the second channel, the wireless component is to use a priority queue based on information received from the VR subsystem via the interface.

In Example 7, the subject matter of Examples 1-6 includes, wherein to propagate the channel switch feedback to the VR subsystem, the interface is to notify the VR subsystem of an upcoming channel switch in advance of the wireless component switching from the radar channel.

In Example 8, the subject matter of Examples 1-7 includes, wherein the VR subsystem is further to render the VR content at a lower frame rate or not render frames during a duration of a channel switch time.

In Example 9, the subject matter of Examples 1-8 includes, wherein the VR subsystem is further to enable frame synthesis for a duration of a channel switch time by sending a message to the head-mounted device via a special wireless queue that the wireless component is to dispatch before switching from the radar channel.

In Example 10, the subject matter of Examples 1-9 includes, wherein the VR subsystem is to identify that queued content is a last portion of a frame, and in response, send the last portion of the frame to a special wireless queue that the wireless component is to dispatch before switching from the radar channel.

In Example 11, the subject matter of Examples 1-10 includes, wherein the VR subsystem is to identify that queued content is a new frame, and in response, discard the queued content instead of sending it to the wireless component.

In Example 12, the subject matter of Examples 1-11 includes, wherein, in response to the wireless component switching to a congested channel from the radar channel, the VR subsystem is to perform a quality of service change.

In Example 13, the subject matter of Example 12 includes, wherein the quality of service change includes an instruction to adjust a graphics processing unit of the device to render frames at a lower resolution or pixel density.

In Example 14, the subject matter of Examples 12-13 includes, wherein the VR subsystem is to determine that the VR content is non-interactive content, and wherein the quality of service change includes an instruction to use a graphics processing unit of the device to decode and render additional frames for a duration of time the wireless component is connected to the congested channel.

In Example 15, the subject matter of Examples 1-14 includes, wherein the wireless component operates in accordance with an IEEE 802.11 family of standards.

Example 16 is a method for using radar channels for virtual reality output comprising: generating virtual reality (VR) content using a VR subsystem of a device; broadcasting, from a wireless component of the device, the VR content to a head-mounted device over a radar channel; detecting a signal on the radar channel using a radar detector of the device; propagating, in response to the radar detector detecting the signal on the radar channel, channel switch feedback to the VR subsystem using an interface between the VR subsystem and the wireless component; and modifying the VR content based on the channel switch feedback, using the VR subsystem.

In Example 17, the subject matter of Example 16 includes, switching to a second channel, using the wireless component, in response to the radar detector detecting the signal on the radar channel.

In Example 18, the subject matter of Example 17 includes, wherein the second channel is a non-radar 5 GHz channel or a 2.4 GHz channel.

In Example 19, the subject matter of Examples 17-18 includes, wherein the second channel is a second radar channel, and further comprising determining, using a second radar detector, that the second radar channel is clear before the wireless component switches to the second radar channel.

In Example 20, the subject matter of Example 19 includes, wherein determining that the second radar channel is clear includes monitoring the second radar channel for at least sixty seconds before switching to the second radar channel.

In Example 21, the subject matter of Examples 17-20 includes, wherein switching to the second channel includes using a priority queue based on information received from the VR subsystem via the interface.

In Example 22, the subject matter of Examples 16-21 includes, wherein propagating the channel switch feedback to the VR subsystem includes notifying the VR subsystem of an upcoming channel switch in advance of switching from the radar channel.

In Example 23, the subject matter of Examples 16-22 includes, rendering the VR content at a lower frame rate or not render frames during a duration of a channel switch time.

In Example 24, the subject matter of Examples 16-23 includes, enabling frame synthesis for a duration of a channel switch time by sending a message to the head-mounted device via a special wireless queue that the wireless component is to dispatch before switching from the radar channel.

In Example 25, the subject matter of Examples 16-24 includes, identifying that queued content is a last portion of a frame, and in response, sending the last portion of the frame to a special wireless queue for dispatching from the wireless component before switching from the radar channel.

In Example 26, the subject matter of Examples 16-25 includes, identifying that queued content is a new frame, and in response, discarding the queued content instead of sending it to the wireless component.

In Example 27, the subject matter of Examples 16-26 includes, in response to the wireless component switching to a congested channel from the radar channel, performing a quality of service change.

In Example 28, the subject matter of Example 27 includes, wherein the quality of service change includes an instruction to adjust a graphics processing unit of the device to render frames at a lower resolution or pixel density.

In Example 29, the subject matter of Examples 27-28 includes, determining that the VR content is non-interactive content, and wherein the quality of service change includes an instruction to use a graphics processing unit of the device to decode and render additional frames for a duration of time the wireless component is connected to the congested channel.

In Example 30, the subject matter of Examples 16-29 includes, wherein the wireless component operates in accordance with an IEEE 802.11 family of standards.

Example 31 is at least one machine-readable medium including instructions for operation of a computing system that, when executed by a machine, cause the machine to perform any of the methods of Examples 16-29.

Example 32 is an apparatus comprising means for performing any of the methods of Examples 16-29.

Example 33 is at least one machine-readable medium including instructions for using radar channels for virtual reality output, which when executed by a processor, cause the processor to: generate virtual reality (VR) content using a VR subsystem of a device; broadcast, from a wireless component of the device, the VR content to a head-mounted device over a radar channel; detect a signal on the radar channel using a radar detector of the device; propagate, in response to the radar detector detecting the signal on the radar channel, channel switch feedback to the VR subsystem using an interface between the VR subsystem and the wireless component; and modify the VR content based on the channel switch feedback, using the VR subsystem.

In Example 34, the subject matter of Example 33 includes, wherein the instructions further cause the processor to switch to a second channel, using the wireless component, in response to the radar detector detecting the signal on the radar channel.

In Example 35, the subject matter of Example 34 includes, wherein the second channel is a non-radar 5 GHz channel or a 2.4 GHz channel.

In Example 36, the subject matter of Examples 34-35 includes, wherein the second channel is a second radar channel, and wherein the instructions further cause the processor to determine, using a second radar detector, that the second radar channel is clear before the wireless component switches to the second radar channel.

In Example 37, the subject matter of Example 36 includes, wherein to determine that the second radar channel is clear, the instructions further cause the processor to monitor the second radar channel for at least sixty seconds before switching to the second radar channel.

In Example 38, the subject matter of Examples 34-37 includes, wherein to switch to the second channel, the instructions further cause the processor to use a priority queue based on information received from the VR subsystem via the interface.

In Example 39, the subject matter of Examples 33-38 includes, wherein to propagate the channel switch feedback to the VR subsystem, the instructions further cause the processor to notify the VR subsystem of an upcoming channel switch in advance of switching from the radar channel.

In Example 40, the subject matter of Examples 33-39 includes, wherein the instructions further cause the processor to render the VR content at a lower frame rate or not render frames during a duration of a channel switch time.

In Example 41, the subject matter of Examples 33-40 includes, wherein the instructions further cause the processor to enable frame synthesis for a duration of a channel switch time by sending a message to the head-mounted device via a special wireless queue that the wireless component is to dispatch before switching from the radar channel.

In Example 42, the subject matter of Examples 33-41 includes, wherein the instructions further cause the processor to identify that queued content is a last portion of a frame, and in response, the instructions further cause the processor to send the last portion of the frame to a special wireless queue for dispatching from the wireless component before switching from the radar channel.

In Example 43, the subject matter of Examples 33-42 includes, wherein the instructions further cause the processor to identify that queued content is a new frame, and in response, the instructions further cause the processor to discard the queued content instead of sending it to the wireless component.

In Example 44, the subject matter of Examples 33-43 includes, wherein the instructions further cause the processor to, in response to the wireless component switching to a congested channel from the radar channel, perform a quality of service change.

In Example 45, the subject matter of Example 44 includes, wherein the quality of service change includes an instruction to adjust a graphics processing unit of the device to render frames at a lower resolution or pixel density.

In Example 46, the subject matter of Examples 44-45 includes, wherein the instructions further cause the processor to determine that the VR content is non-interactive content, and wherein the quality of service change includes an instruction to use a graphics processing unit of the device to decode and render additional frames for a duration of time the wireless component is connected to the congested channel.

In Example 47, the subject matter of Examples 33-46 includes, wherein the wireless component operates in accordance with an IEEE 802.11 family of standards.

Example 48 is an apparatus for using radar channels for virtual reality output comprising: means for generating virtual reality (VR) content using a VR subsystem of a device; means for broadcasting, from a wireless component of the device, the VR content to a head-mounted device over a radar channel; means for detecting a signal on the radar channel using a radar detector of the device; means for propagating, in response to the radar detector detecting the signal on the radar channel, channel switch feedback to the VR subsystem using an interface between the VR subsystem and the wireless component; and means for modifying the VR content based on the channel switch feedback, using the VR subsystem.

In Example 49, the subject matter of Example 48 includes, means for switching to a second channel, using the wireless component, in response to the radar detector detecting the signal on the radar channel.

In Example 50, the subject matter of Example 49 includes, wherein the second channel is a non-radar 5 GHz channel or a 2.4 GHz channel.

In Example 51, the subject matter of Examples 49-50 includes, wherein the second channel is a second radar channel, and further comprising means for determining, using a second radar detector, that the second radar channel is clear before the wireless component switches to the second radar channel.

In Example 52, the subject matter of Example 51 includes, wherein the means for determining that the second radar channel is clear include means for monitoring the second radar channel for at least sixty seconds before switching to the second radar channel.

In Example 53, the subject matter of Examples 49-52 includes, wherein the means for switching to the second channel include means for using a priority queue based on information received from the VR subsystem via the interface.

In Example 54, the subject matter of Examples 48-53 includes, wherein the means for propagating the channel switch feedback to the VR subsystem include means for notifying the VR subsystem of an upcoming channel switch in advance of switching from the radar channel.

In Example 55, the subject matter of Examples 48-54 includes, means for rendering the VR content at a lower frame rate or not render frames during a duration of a channel switch time.

In Example 56, the subject matter of Examples 48-55 includes, means for enabling frame synthesis for a duration of a channel switch time by sending a message to the head-mounted device via a special wireless queue that the wireless component is to dispatch before switching from the radar channel.

In Example 57, the subject matter of Examples 48-56 includes, means for identifying that queued content is a last portion of a frame, and in response, means for sending the last portion of the frame to a special wireless queue for dispatching from the wireless component before switching from the radar channel.

In Example 58, the subject matter of Examples 48-57 includes, means for identifying that queued content is a new frame, and in response, means for discarding the queued content instead of sending it to the wireless component.

In Example 59, the subject matter of Examples 48-58 includes, in response to the wireless component switching to a congested channel from the radar channel, means for performing a quality of service change.

In Example 60, the subject matter of Example 59 includes, wherein the quality of service change includes an instruction to adjust a graphics processing unit of the device to render frames at a lower resolution or pixel density.

In Example 61, the subject matter of Examples 59-60 includes, means for determining that the VR content is non-interactive content, and wherein the quality of service change includes an instruction to use a graphics processing unit of the device to decode and render additional frames for a duration of time the wireless component is connected to the congested channel.

In Example 62, the subject matter of Examples 48-61 includes, wherein the wireless component operates in accordance with an IEEE 802.11 family of standards.

Example 63 is at least one machine-readable medium including instructions that, when executed by processing circuitry, cause the processing circuitry to perform operations to implement of any of Examples 1-62.

Example 64 is an apparatus comprising means to implement any of Examples 1-62.

Example 65 is a system to implement of any of Examples 1-62.

Example 66 is a method to implement of any of Examples 1-62.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMS), read only memories (ROMs), and the like.

What is claimed is:

1. A device for using radar channels for virtual reality output comprising:
    a virtual reality (VR) subsystem to generate VR content;
    a wireless component to broadcast the VR content to a head-mounted device over a radar channel;
    a radar detector to detect a signal on the radar channel;
    an interface between the VR subsystem and the wireless component to, in response to the radar detector detecting the signal on the radar channel, propagate channel switch feedback to the VR subsystem; and
    wherein the VR subsystem is to modify the VR content based on the channel switch feedback.

2. The device of claim 1, wherein the wireless component is to switch to a second channel in response to the radar detector detecting the signal on the radar channel.

3. The device of claim 2, wherein the second channel is a non-radar 5 GHz channel or a 2.4 GHz channel.

4. The device of claim 2, wherein the second channel is a second radar channel, and wherein the device further comprises a second radar detector to determine that the second radar channel is clear before the wireless component switches to the second radar channel.

5. The device of claim 4, wherein to determine that the second radar channel is clear, the second radar detector is to monitor the second radar channel for at least sixty seconds before the wireless component switches to the second radar channel.

6. The device of claim 2, wherein to switch to the second channel, the wireless component is to use a priority queue based on information received from the VR subsystem via the interface.

7. The device of claim 1, wherein to propagate the channel switch feedback to the VR subsystem, the interface is to notify the VR subsystem of an upcoming channel switch in advance of the wireless component switching from the radar channel.

8. The device of claim 1, wherein the VR subsystem is further to render the VR content at a lower frame rate or not render frames during a duration of a channel switch time.

9. The device of claim 1, wherein the VR subsystem is further to enable frame synthesis for a duration of a channel switch time by sending a message to the head-mounted device via a special wireless queue that the wireless component is to dispatch before switching from the radar channel.

10. The device of claim 1, wherein the VR subsystem is to identify that queued content is a last portion of a frame, and in response, send the last portion of the frame to a special wireless queue that the wireless component is to dispatch before switching from the radar channel.

11. The device of claim 1, wherein the VR subsystem is to identify that queued content is a new frame, and in response, discard the queued content instead of sending it to the wireless component.

12. The device of claim 1, wherein, in response to the wireless component switching to a congested channel from the radar channel, the VR subsystem is to perform a quality of service change.

13. The device of claim 12, wherein the quality of service change includes an instruction to adjust a graphics processing unit of the device to render frames at a lower resolution or pixel density.

14. The device of claim 12, wherein the VR subsystem is to determine that the VR content is non-interactive content, and wherein the quality of service change includes an instruction to use a graphics processing unit of the device to decode and render additional frames for a duration of time the wireless component is connected to the congested channel.

15. The device of claim 1, wherein the wireless component operates in accordance with an IEEE 802.11 family of standards.

16. A method for using radar channels for virtual reality output comprising:
    generating virtual reality (VR) content using a VR subsystem of a device:
    broadcasting, from a wireless component of the device, the VR content to a head-mounted device over a radar channel;
    detecting a signal on the radar channel using a radar detector of the device;
    propagating, in response to the radar detector detecting the signal on the radar channel, channel switch feedback to the VR subsystem using an interface between the VR subsystem and the wireless component; and
    modifying the VR content based on the channel switch feedback, using the VR subsystem.

17. The method of claim 16, further comprising switching to a second channel, using the wireless component, in response to the radar detector detecting the signal on the radar channel.

18. The method of claim 17, wherein the second channel is a second radar channel, and further comprising determining, using a second radar detector, that the second radar channel is clear before the wireless component switches to the second radar channel.

19. The method of claim 18, wherein determining that the second radar channel is clear includes monitoring the second radar channel for at least sixty seconds before switching to the second radar channel.

20. The method of claim 17, wherein switching to the second channel includes using a priority queue based on information received from the VR subsystem via the interface.

21. The method of claim 16, wherein propagating the channel switch feedback to the VR subsystem includes notifying the VR subsystem of an upcoming channel switch in advance of switching from the radar channel.

22. The method of claim 16, further comprising rendering the VR content at a lower frame rate or not render frames during a duration of a channel switch time.

23. At least one non-transitory machine-readable medium including instructions for using radar channels for virtual reality output, which when executed by a processor, cause the processor to:
    generate virtual reality (VR) content using a VR subsystem of a device:
    broadcast, from a wireless component of the device, the VR content to a head-mounted device over a radar channel;
    detect a signal on the radar channel using a radar detector of the device;
    propagate, in response to the radar detector detecting the signal on the radar channel, channel switch feedback to the VR subsystem using an interface between the VR subsystem and the wireless component; and modify the VR content based on the channel switch feedback, using the VR subsystem.

24. The at least one non-transitory machine-readable medium of claim 23, wherein to propagate the channel switch feedback to the VR subsystem, the instructions further cause the processor to notify the VR subsystem of an upcoming channel switch in advance of switching from the radar channel.

25. The at least one non-transitory machine-readable medium of claim 23, wherein the instructions further cause the processor to render the VR content at a lower frame rate or not render frames during a duration of a channel switch time.

* * * * *